United States Patent
Ikeshita et al.

(10) Patent No.: US 12,424,233 B2
(45) Date of Patent: Sep. 23, 2025

(54) TARGET SOURCE SIGNAL GENERATION APPARATUS, TARGET SOURCE SIGNAL GENERATION METHOD, AND PROGRAM

(71) Applicant: NIPPON TELEGRAPH AND TELEPHONE CORPORATION, Tokyo (JP)

(72) Inventors: Rintaro Ikeshita, Tokyo (JP); Tomohiro Nakatani, Tokyo (JP); Shoko Araki, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 226 days.

(21) Appl. No.: 18/265,909

(22) PCT Filed: Dec. 14, 2020

(86) PCT No.: PCT/JP2020/046508
§ 371 (c)(1),
(2) Date: Jun. 7, 2023

(87) PCT Pub. No.: WO2022/130445
PCT Pub. Date: Jun. 23, 2022

(65) Prior Publication Data
US 2024/0038253 A1    Feb. 1, 2024

(51) Int. Cl.
*G10L 21/0216* (2013.01)
*G06F 17/11* (2006.01)
*G06F 17/16* (2006.01)

(52) U.S. Cl.
CPC .......... *G10L 21/0216* (2013.01); *G06F 17/11* (2013.01); *G06F 17/16* (2013.01)

(58) Field of Classification Search
CPC ....... G10L 21/0216; G06F 17/11; G06F 17/16
See application file for complete search history.

(56) References Cited

U.S. PATENT DOCUMENTS

2019/0267019 A1* 8/2019 Ito .................. G06F 18/2134

FOREIGN PATENT DOCUMENTS

WO    WO-2021100136 A1 *  5/2021

OTHER PUBLICATIONS

Robin Scheibler and Nobutaka Ono (2019) "Independent vector analysis with more microphones than sources," in Proc. WASPAA, 2019.

(Continued)

*Primary Examiner* — Fan S Tsang
*Assistant Examiner* — Tyler Michael Liebgott

(57) ABSTRACT

A sound source signal generation technology based on an optimization algorithm that enables high-speed processing of sound source extraction is provided. A sound source signal generation device includes an optimization unit that optimizes a separation matrix $W(f)=[w_1(f), \ldots, w_K(f), W_Z(f)]$ using an observed signal $x(f, t)$, the optimization unit includes an auxiliary function calculation unit that calculates an auxiliary function $V_i(f)$ ($i=1, \ldots, K$) according to a predetermined equation, a first separation filter calculation unit that calculates a separation filters $w_i(f)$ ($i=1, \ldots, K$) using auxiliary functions $V_i(f)$ ($i=1, \ldots, K$) and $V_Z(f)$, and a second separation filter calculation unit that calculates a separation filter $W_Z(f)$ according to a predetermined equation when a convergence condition is satisfied.

5 Claims, 3 Drawing Sheets

(56) References Cited

OTHER PUBLICATIONS

Ikeshita et al. (2020) "Block Coordinate Descent Algorithms for Auxiliary-function-based Independent Vector Extraction" Published on Oct. 18, 2020, arXiv Internet: <URL: https://arxiv.org/abs/2010.08959v1>, <URL:https://arxiv.org/pdf/2010.08959v1.pdf>.

\* cited by examiner

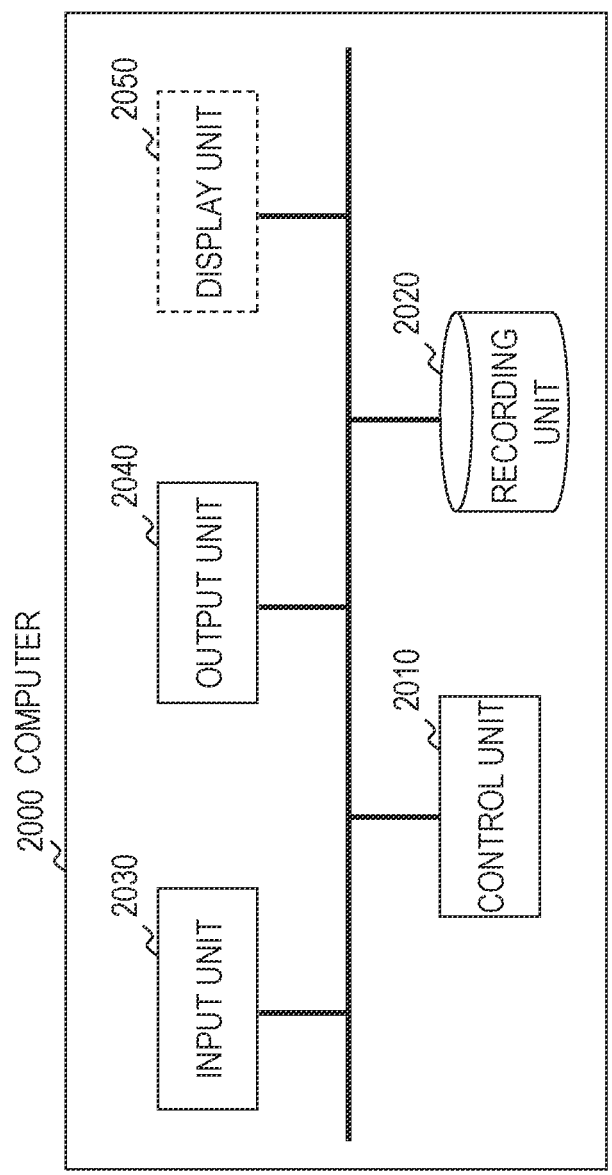

TARGET SOURCE SIGNAL GENERATION APPARATUS, TARGET SOURCE SIGNAL GENERATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/046508, filed on 14 Dec. 2020, the disclosure of which is hereby incorporated herein by reference in its entirety.

TECHNICAL FIELD

The present invention relates to a technology for extracting a signal from each sound source included in a mixed acoustic signal observed by using a plurality of microphones.

BACKGROUND ART

Sound source extraction technology for estimating a signal from each sound source before mixing from a mixed acoustic signal (hereinafter simply referred to as an observed signal) observed using a plurality of microphones is widely used for speech recognition preprocessing. As a sound source extraction technology, for example, independent vector extraction (IVE) described in NPL 1 is known.

CITATION LIST

Non Patent Literature

[NPL 1] Robin Scheibler and Nobutaka Ono, "Independent vector analysis with more microphones than sources," in Proc. WASPAA, 2019.

SUMMARY OF INVENTION

Technical Problem

However, independent vector extraction of the related art has a problem that a processing time required for sound source extraction increases as the number of microphones increases.

Therefore, an object of the present invention is to provide a sound source signal generation technology based on an optimization algorithm that enables high-speed processing of sound source extraction.

Solution to Problem

An aspect of the present invention is a sound source signal generation device in which K and M are integers satisfying $1 \leq K < M$, $x(f, t)$ ($f=1, \ldots, F, t=1, \ldots, T$) (where f is an index indicating a frequency bin and t is an index indicating a time frame) is an observed signal of mixed sound from K sound sources observed using M microphones, $x_i(f, t)$ ($i=1, \ldots, K$, $f=1, \ldots, F, t=1, \ldots, T$) is an i-th sound source signal, the i-th sound source signal being an estimation signal of an i-th sound source, $W(f)=[w_1(f), \ldots, w_K(f), W_Z(f)]$ (where $w_i(f) \in C^M$ ($i=1, \ldots, K$) is a separation filter for the i-th sound source signal, and $W_Z(f) \in C^{M \times (M-K)}$ is a separation filter for a noise signal) is a separation matrix, $V_i(f)$ ($i=1, \ldots, K$) is an auxiliary function of the i-th sound source signal, and $V_Z(f)$ is an auxiliary function of the noise signal, the sound source signal generation device including an initialization unit configured to initialize a separation matrix $W(f)$ and an auxiliary function $V_Z(f)$; an optimization unit configured to optimize the separation matrix $W(f)$ using the observed signal $x(f, t)$; and a sound source signal generation unit configured to generate an i-th sound source signal $x_i(f, t)$ from the observed signal $x(f, t)$ using the separation matrix $W(f)$, wherein the optimization unit includes an auxiliary function calculation unit configured to calculate the auxiliary function $V_i(f)$ ($i=1, \ldots, K$) using predetermined equations; a first separation filter calculation unit configured to calculate the separation filter $w_i(f)$ ($i=1, \ldots, K$) using auxiliary functions $V_i(f)$ ($i=1, \ldots, K$) and $V_z(f)$; and a second separation filter calculation unit configured to calculate a separation filter $W_Z(f)$ according to a predetermined equation when a convergence condition is satisfied.

Advantageous Effects of Invention

According to the present invention, it is possible to execute sound source extraction processing at a high speed.

BRIEF DESCRIPTION OF DRAWINGS

FIG. 5 is a diagram illustrating an example of a functional configuration of a computer that realizes each device according to an embodiment of the present invention.

DESCRIPTION OF EMBODIMENTS

Figure 1:
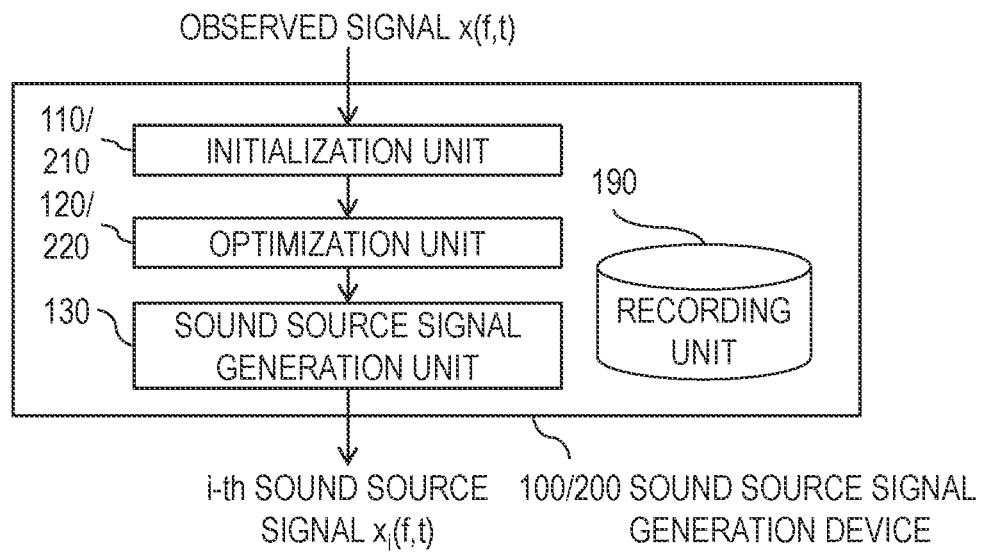
FIG. 1 is a block diagram illustrating a configuration of a sound source signal generation device 100/200.

Hereinafter, embodiments of the present invention will be described in detail. Components having the same function are denoted by the same reference signs, and redundant description is omitted.

A notation method used in this specification will be described before the embodiments are described.

^ (caret) represents a superscript. For example, $x^{y^{\wedge}z}$ means that $y^z$ is a superscript to x and $x_{y^{\wedge}z}$ means that $y_z$ is a subscript to x. Further, _ (underscore) represents a subscript. For example, $x^{y\_z}$ means that $y_z$ is a superscript to x and $x_{y\_z}$ means that $y_z$ is a subscript to x.

Superscripts "^" and "~" as in ^x and ~x for a certain character x would normally be written directly above "x," but are written as ^x or ~x here due to restrictions on notation in this specification.

Notation

C is a set of complex numbers, d and d' are integers equal to or greater than 1, $I_d \in C^{d \times d}$ represents a d-dimensional unit matrix, and $O_{d,d'} \in C^{d \times d'}$ represents a d×d' zero matrix. Further, $e_j^{(d)}$ represents a d-dimensional unit vector in which a j-th element is 1 and the other elements are 0.

For a vector v and a matrix A, $v^T$ and $A^T$ represent a transposed vector of the vector v and a transposed matrix of the matrix A, respectively. Further, $v^h$ and $A^h$ represent a complex conjugate transposed vector of the vector v and a complex conjugate transposed matrix of the matrix A, respectively.

$\|v\|$ represents a Euclidean norm for the vector v. That is, $\|v\|=(v^h v)^{1/2}$.

TECHNICAL BACKGROUND

1: Formulation of Problem

Hereinafter, sound source extraction technology is treated as sound source extraction in a the short-time Fourier transform domain.

A situation in which signals from K sound sources and (M−K)-dimensional noise signals are observed using the M microphones is considered. Here, it is assumed that $1 \leq K < M$. f is an index indicating a frequency bin, t is an index indicating time, and an observed signal x(f, t) (f=1, ..., F and t=1, ..., T) in the short-time Fourier transform domain is represented as follows:

$$x(f,t)=A_s(f)s(f,t)+A_z(f)z(f,t) \in C^M \quad [\text{Math. 1}]$$

$$A_s(f)=[a_1(f), \ldots, a_K(f)] \in C^{M \times K} \quad [\text{Math. 2}]$$

$$s(f,t)=[s_1(f,t), \ldots, s_K(f,t)]^T \in C^K \quad [\text{Math 3}]$$

$$A_z(f) \in C^{M \times (M-K)} \quad [\text{Math. 4}]$$

$$z(f,t) \in C^{M-K} \quad [\text{Math. 5}]$$

Here, $s_i(f, t) \in C (i=1, \ldots, K)$ is an STFT coefficient of an i-th sound source, and $z(f, t) \in C^{M-K}$ is an STFT coefficient of the noise. Further, $a_i(f) \in C^M$ (i=1, ..., K) is an acoustic transfer function from the i-th sound source to the M microphones, and $A_z(f) \in C^{M \times (M-K)}$ is an acoustic transfer function of the noise up to the M microphones.

A blind sound source extraction problem (hereinafter referred to as a BSE problem) and a semi-blind sound source extraction problem (hereinafter referred to as a semi-BSE problem) are formulated as follows.

Bse Problem

This is a problem for obtaining the i-th sound source signal $x_i(f, t) \in C^M$ (i=1, ..., K, f=1, ..., F and t=1, ..., T) that is an estimation signal of the i-th sound source, with the number K of sound sources and the observed signal x(f, t) (f=1, ..., F, t=1, ..., T) as inputs.

$$x_i(f,t)=a_i(f)s_i(f,t) \quad [\text{Math. 6}]$$

Semi-BSE Problem

This is a problem for obtaining the i-th sound source signal $x_i(f, t)$ (i=1, ..., K, f=1, ..., F, t=1, ..., T) that is an estimation signal of the i-th sound source, with the number K of sound sources, the observed signal x(f, t) (f=1, ..., F, t=1, ..., T), and an acoustic transfer function $a_i(f)$ (i=1, ..., L, where L is an integer that satisfies $1 \leq L \leq K$) as inputs. When L=K, the semi-BSE problem is called a beamforming problem.

Next, an assumption for the BSE problem and the semi-BSE problem (hereinafter referred to as an independent vector extraction model) dealt with in the present invention will be described. A matrix $A(f) \in C^{M \times M}$ is defined by the following equation.

$$A(f)=[a_1(f), \ldots, a_K(f), A_z(f)] \quad [\text{Math. 7}]$$

Further, a vector $s_t(t) \in C^F$ is defined by the following equation.

$$s_t(t)=[s_t(1,t), \ldots, s_t(F,t)]^T \quad [\text{Math. 8}]$$

Assumption 1

It is assumed that there is a matrix $W(f) \in C^{M \times M}$ that satisfies $W(f)^h A(f)=I_M$ for the matrix $A(f) \in C^{M \times M}$. Here, $$W(f)=[w_1(f), \ldots, w_K(f), W_z(f)] \quad [\text{Math. 9}]$$

$$w_i(f) \in C^M (i=1, \ldots, K) \quad [\text{Math. 10}]$$

$$W_z(f) \in C^{M \times (M-K)} \quad [\text{Math. 11}]$$

Here, $w_i(f) \in C^M$ (i=1, ..., K) is called a separation filter for an i-th sound source signal, $W_z(f) \in C^{M \times (M-K)}$ is called a separation filter for a noise signal, and the matrix W(f) is called the separation matrix.

$W(f)^h A(f)=I_M$ is equivalent to the following equation.

$$s_i(f,t)=w_i(f)^h x(f,t) \in C (i=1, \ldots, K) \quad [\text{Math. 12}]$$

$$z(f,t)=W_z(f)^h x(f,t) \in C^{M-K} \quad [\text{Math. 13}]$$

Assumption 2

Probability variables $\{s_i(t), z(f, t)\}_{i,f,t}$ are assumed to be independent of each other. That is, it is assumed that the following equation is established.

$$p(\{s_i(t),z(f,t)\}_{i,f,t})=\Pi_{i,t}p(s_i(t))\Pi_{f,t}p(z(f,t)) \quad [\text{Math. 14}]$$

Assumption 3

The vector $s_i(t)$ is assumed to follow a cyclic symmetric super-Gaussian distribution. That is, it is assumed that the following equation is established.

$$-\log p(s_i(t))=G(\|s_i(t)\|)+\text{const} \quad [\text{Math. 15}]$$

Here, G(r) is a differentiable function from a set $R_{\geq 0}$ of real numbers equal to or greater than 0 to a set R of the real numbers, and a function G'(r)/r (G' represents a differential function of G) is assumed not to increase for r>0.

Assumption 1

It is assumed that an STFT coefficient of the noise $z(f, t) \in C^{M-K}$ follows a complex Gaussian distribution of which a mean is a zero matrix $0_{M-K}$ and a variance is a unit matrix $I_{M-K}$. $z(f, t) \sim CN(0_{M-K}, I_{M-K})$, that is, $$p(z(f, t)) = \frac{1}{\pi^{M-K}} \exp(-\|z(f, t)\|^2) \quad [\text{Math. 16}]$$

is assumed to be established.

Therefore, the independent vector extraction model handled in the present invention is a model that satisfies Assumptions 1 to 4, and both the BSE problem and the semi-BSE problem come down to a problem of obtaining the separation matrix W(f) (f=1, ..., F).

2: Algorithm for Obtaining Separation Matrix W(f)

An algorithm for obtaining the separation matrix W(f) that is used in each embodiment of the present invention will be described herein. The present algorithm is based on a majorization-minimization (MM) approach, and consists of Algorithms 1, 2, 3, and 4.

Algorithm 1 optimizes the separation matrix W(f) using auxiliary functions $V_i(f)$ (i=1, ..., K) and $V_z(f)$. Algorithm 1 is roughly divided into initialization processing, optimization processing, and sound source extraction processing. Any one of Algorithm 2, Algorithm 3, and Algorithm 4 is used in the optimization processing.

Algorithm 2 is an algorithm for solving the BSE problem when K=1. Here, high-speed sound source extraction is realized by optimizing only the separation filter $w_i(f)$ corresponding to the first sound source, instead of optimizing the separation matrix W(f).

Algorithm 3 is an algorithm for solving the BSE problem when K>1. Here, only the separation filters $w_1(f), ..., w_K(f)$ corresponding to K sound sources are optimized instead of the separation matrix W(f) being optimized, to achieve high-speed sound source extraction.

Algorithm 4 is an algorithm for solving the semi-BSE problem. An optimization algorithm of a linear constrained minimum variance (LCMV) beamformer is used for separation filters $w_1(f), ..., w_L(f)$ corresponding to L sound sources with a known acoustic transfer function, whereas optimization is performed in the same method as Algorithm 2 or Algorithm 3 for the remaining separation filters $w_{L+1}(f), ..., w_K(f)$ corresponding to K-L sound sources, thereby realizing high-speed sound source extraction.

First, Algorithm 1 is shown. In this algorithm, a function defined by the following equation is used as a function G in Assumption 3, and a parameter $\alpha_i$ (i=1, ..., K) is also an optimization target.

$$G(r_i(t), \alpha) = \left(\frac{r_i(t)}{\alpha_i}\right)^\beta + 2F\log\alpha_i \quad \text{[Math. 17]}$$

(where β is a predetermined constant.)

Here, it is assumed that $^-W(f) = [^-w_{L+1}(f), ..., ^-w_K(f), ^-W_Z(f)]$ (here, $^-w_i(f) \in C^{(M-L)}$ (i=L+1, ..., K) is a separation filter for the i-th sound source signal, and $^-W_Z(f) \in C^{(M-L)\times(M-K)}$ is a separation filter for a noise signal).

Algorithm 1

/ * Initialization*/
1.
[Math. 18]
W(f) ← $-I_M$
2:

[Math. 19]
$$V_z(f) \leftarrow \frac{1}{T}\sum_{t=1}^{T} x(f,t)x(f,t)^h$$

3: if using Algorithm 2 or Algorithm 3 then
4: update the separation filter $W_z(f)$ using the following equation.

[Math. 20]
$$W_z(f) \leftarrow \begin{bmatrix} (W_s(f)^h V_z(f) E_s)^{-1}(W_s(f)^h V_z(f) E_z) \\ -I_{M-K} \end{bmatrix}$$

(where $W_s(f) = [w_1(f), ..., w_K(f)]$, $E_s = [e_1^{(M)}, ..., e_K^{(M)}]$, and $E_z = [e_{K+1}^{(M)}, ..., e_M^{(M)}]$)

5: end if
6: if using Algorithm 4 then
7:
[Math. 21]
$W_2'(f) \leftarrow [A_1(f), E_2]^{-h} E_2$
(where $A_1(f) = [a_1(f), ..., a_L(f)]$, $E_2 = [e_{L+1}^{(M)}, ..., e_M^{(M)}]$)
8:
[Math. 22]
$^-V_z(f) \leftarrow W_2'(f)^h V_z(f) W_2'(f)$
9: update the separation filter $W_z(f)$ using the following equation.

[Math. 23]
$$W_z(f) \leftarrow W_2'(f)\begin{bmatrix} (^-W_s(f)^h \,^-V_z(f) \,^-E_s)^{-1}(^-W_s(f)^h \,^-V_z(f) \,^-E_z) \\ -I_{M-K} \end{bmatrix}$$

(where $^-W_s(f) = [^-w_{L+1}(f), ..., ^-w_K(f)]$, $^-E_s = [e_1^{(M-L)}, ..., e_{K-L}^{(M-L)}]$, $^-E_z = [e_{K-L+1}^{(M-L)}, ..., e_{M-L}^{(M-L)}]$)
10: end if
/ * Start Optimization * /
11: repeat
12: for i = 1, ..., K do
13:
[Math. 24]
$s_i(f,t) \leftarrow w_i(f)^h x(f,t)$
14:
[Math. 25]
$r_i(t) \leftarrow \|s_i(t)\|$
15

[Math. 26]
$$\alpha_i^\beta \leftarrow \frac{\beta}{2F}\left(\frac{1}{T}\sum_t r_i(t)^\beta\right)$$

16:

[Math. 27]
$$\phi_i(t) \leftarrow \frac{G'(r_i(t),\alpha_i)}{2r_i(t)} = \frac{\beta}{2}\frac{1}{\alpha_i^\beta r_i(t)^{2-\beta}}$$

17:
[Math. 28]
$\phi_i(t) \leftarrow \min\{\phi_i(t), 10^5 \times \min\{\phi_i(t)\}_{t=1}^T\}$
//for numerical stability
18:
[Math. 29]
$$V_i(f) \leftarrow \frac{1}{T}\sum_t \phi_i(t)x(f,t)x(f,t)^h$$

19:
[Math. 30]
$V_i(f) \leftarrow V_i(f) + 10^{-3}tr(V_i(f))I_M$
// for numerical stability
20: end for
21: update the separation matrix W(f) for each frequency bin f using any one of Algorithm 2, Algorithm 3, and Algorithm 4.
22: until convergence
23: if using Algorithm 2 or Algorithm 3 then
24: update the separation filter $W_z(f)$ using the following equation.

[Math. 31]
$$W_z(f) \leftarrow \begin{bmatrix} (W_s(f)^h V_z(f) E_s)^{-1}(W_s(f)^h V_z(f) E_z) \\ -I_{M-K} \end{bmatrix}$$

25: end if
26: if using Algorithm 4 then
27: update the separation filter $W_z(f)$ using the following equation.

[Math. 32]
$$W_z(f) \leftarrow W_2'(f)\begin{bmatrix} (^-W_s(f)^h \,^-V_z(f) \,^-E_s)^{-1}(^-W_s(f)^h \,^-V_z(f) \,^-E_z) \\ -I_{M-K} \end{bmatrix}$$

28: end if
29:
[Math. 33]
$x_i(f,t) \leftarrow (W(f)^{-h} e_i^{(M)}) w_i(f)^h x(f,t)$ Next, Algorithm 2 is shown.

Algorithm 2

---
1: obtain a vector u corresponding to a maximum eigenvalue $\lambda_{max}$ by solving the following equation.
[Math. 34]
$V_z(f)u = \lambda_{max} V_1(f)u$
2:
[Math. 35]
$w_1(f) \leftarrow u(u^h V_1(f)u)^{-1/2}$
---

Next, Algorithm 3 is shown.

Algorithm 3

---
1: for i = 1, ..., K do
2: for k ∈ [i, z] do
3:
[Math. 36]
$P_k(f) \leftarrow (w(f)^h V_k(f))^{-1} [e_i^{(M)}, E_z]$
4:
[Math. 37]
$G_k(f) \leftarrow P_k(f)^h V_k(f) P_k(f)$
5: end for
6: obtain a vector b corresponding to the maximum eigenvalue $\lambda_{max}$ by solving the following equation.
[Math. 38]
$G_i(f)b = \lambda_{max} G_z(f)b$
7:
[Math. 39]
$w_i(f) \leftarrow P_i(f)b(b^h G_i(f)b)^{-1/2}$
8: end for
---

Finally, Algorithm 4 is shown.

Algorithm 4

---
/* LCMV Beamforming */
1: for i = 1, ..., L do
2:
[Math. 40]
$w_i(f) \leftarrow V_i(f)^{-1} A_1(f)(A_1(f)^h V_i(f) A_1(f))^{-1} e_i^{(L)}$
3: end for
4: if L = K then
5: return
6: end if
/* BCD */
7: for i = L + 1, ..., K do
8:
[Math. 41]
$\overline{V}_i(f) \leftarrow W_2'(f)^h V_i(f) W_2'(f)$
9: end for 10: if L = K-1 then
11: obtain a vector $\overline{u}$ corresponding to the maximum eigenvalue $\lambda_{max}$ by solving the following equation.
[Math. 42]
$\overline{V}_z(f)\overline{u} = \lambda_{max} \overline{V}_K(f)\overline{u}$
12:
[Math. 43]
$w_K(f) \leftarrow W_2'(f)\overline{u}(\overline{u}^h \overline{V}_K(f)\overline{u})^{-1/2}$
13: else
14: for i = L + 1, ..., K do
15: for K ∈ [I, z] do
16:
[Math. 44]
$\overline{P}_K(f) \leftarrow (\overline{W}(f)^h \overline{V}_k(f))^{-1} [e_i^{(M-L)}, \overline{E}_z]$
17:
[Math. 45]
$\overline{G}_k(f) \leftarrow \overline{P}_k(f)^h \overline{V}_k(f) \overline{P}_k(f)$
18: end for
19: obtain the vector $\overline{b}$ corresponding to the maximum eigenvalue $\lambda_{max}$ by solving the following equation.
[Math. 46]
$\overline{G}_i(f)\overline{b} = \lambda_{max} \overline{G}_z(f)\overline{b}$
20:
[Math. 47]
$w_i(f) \leftarrow W_2'(f)\overline{P}_i(f)\overline{b}(\overline{b}^h \overline{G}_i(f)\overline{b})^{-1/2}$
1
21: end for
22: end if
---

First Embodiment

In the present embodiment, a form for solving the BSE problem will be described.

The sound source signal generation device 100 generates the i-th sound source signal $x_i(f, t)$ (i=1, ..., K, f=1, ..., F, t=1, ..., T) that is an estimation signal of the i-th sound source from the observed signal x(f, t) (f=1, ..., F, t=1, ..., T) of mixed sound from the K sound sources observed using the M microphones. Here, K and M are integers satisfying 1≤K<M. Further, $W(f)=[w_1(f), ..., w_K(f), W_Z(f)]$ (where $w_i(f) \in C^M$ (i=1, ..., K) is a separation filter for an i-th sound source signal, and $W_Z(f) \in C^{M \times (M-K)}$ is a separation filter for a noise signal) is a separation matrix, $V_i(f)$ (i=1, ..., K) is an auxiliary function of the i-th sound source signal, and $V_Z(f)$ is an auxiliary function of the noise signal.

Figure 2:
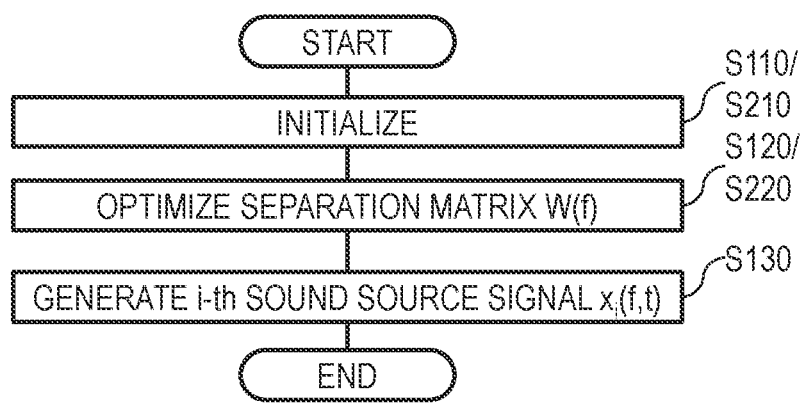
FIG. 2 is a flowchart illustrating an operation of the sound source signal generation device 100/200.

The sound source signal generation device 100 will be described below with reference to FIGS. 1 and 2. FIG. 1 is a block diagram illustrating a configuration of the sound source signal generation device 100. FIG. 2 is a flowchart illustrating an operation of the sound source signal generation device 100. As illustrated in FIG. 1, the sound source signal generation device 100 includes an initialization unit 110, an optimization unit 120, a sound source signal generation unit 130, and a recording unit 190. The recording unit 190 is a component that appropriately records information necessary for processing of the sound source signal generation device 100.

The operation of the sound source signal generation device 100 will be described according to FIG. 2.

In S110, the initialization unit 110 initializes and outputs the separation matrix W(f) and the auxiliary function $V_Z(f)$. The separation matrix W(f) and the auxiliary function $V_Z(f)$ may be initialized, for example, by processing from 1 to 5 in Algorithm 1 described in <Technical Background>.

In S120, the optimization unit 120 receives the observed signal x(f, t) as an input, optimizes the separation matrix W(f) using the observed signal x(f, t), and outputs a result thereof.

Figure 3:
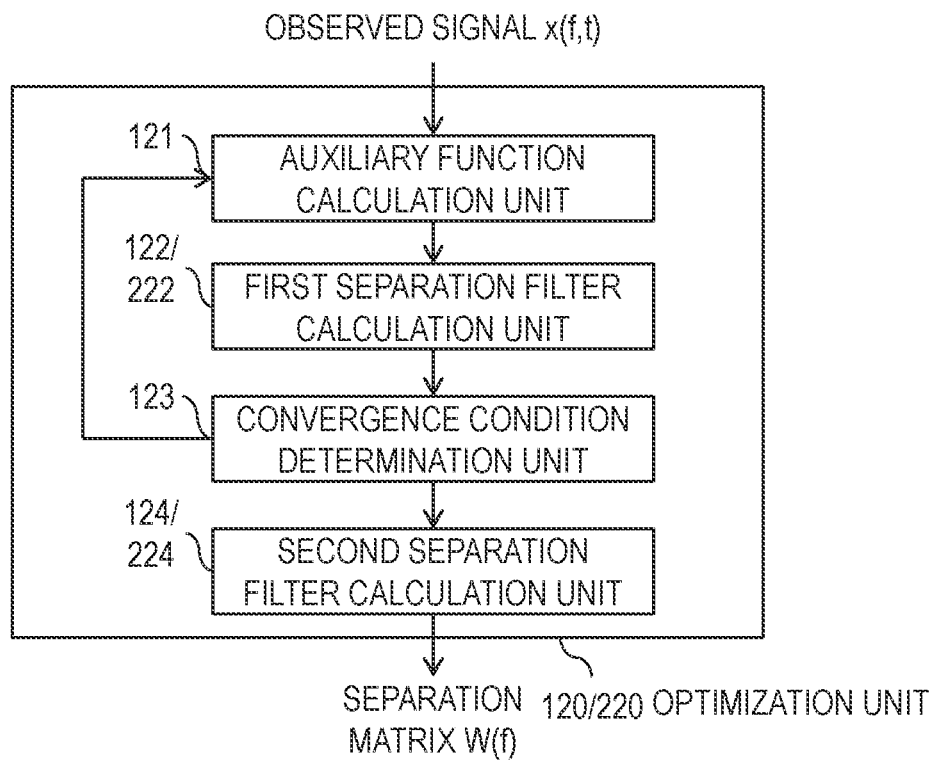
FIG. 3 is a block diagram illustrating a configuration of an optimization unit 120/220.
Figure 4:
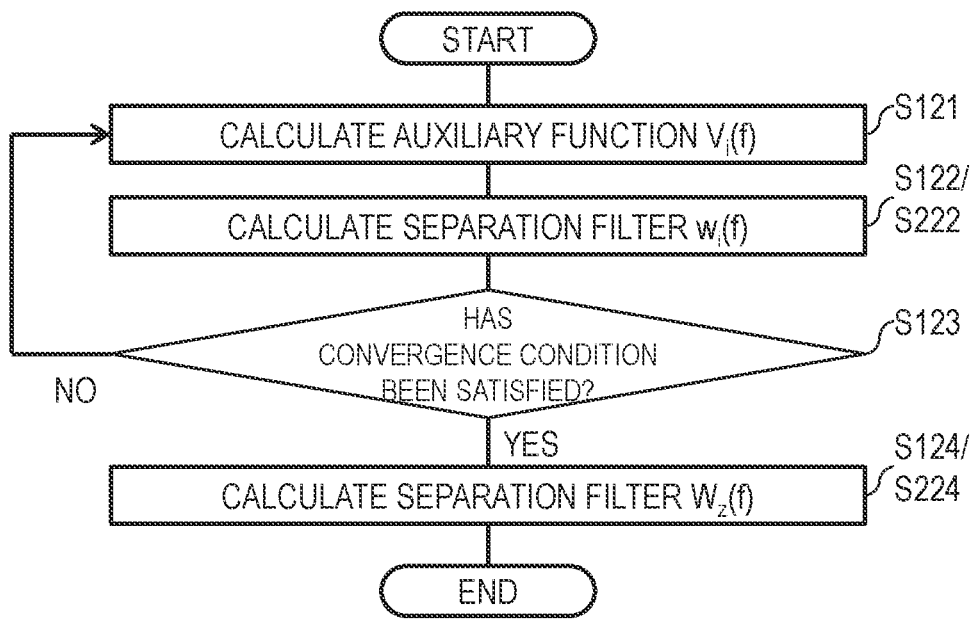
FIG. 4 is a flowchart illustrating an operation of the optimization unit 120/220.

Hereinafter, the optimization unit 120 will be described with reference to FIGS. 3 and 4. FIG. 3 is a block diagram illustrating a configuration of the optimization unit 120. FIG. 4 is a flowchart illustrating an operation of the optimization unit 120. As illustrated in FIG. 3, the optimization unit 120 includes an auxiliary function calculation unit 121, a first separation filter calculation unit 122, a convergence condition determination unit 123, and a second separation filter calculation unit 124.

The operation of the optimization unit 120 will be described according to FIG. 4.

In S121, the auxiliary function calculation unit 121 calculates an auxiliary function $V_i(f)$ (i=1, ..., K) using the following equation.

$$s_i(f,t) \leftarrow w_i(f)^h x(f,t) \qquad [\text{Math. 48}]$$

$$r_i(t) \leftarrow \|s_i(t)\| \qquad [\text{Math. 49}]$$

(where $s_i(t) = [s_i(1, t), \ldots, s_i(F, t)]^T$)

$$\alpha_i^\beta \leftarrow \frac{\beta}{2F}\left(\frac{1}{T}\sum_t r_i(t)^\beta\right) \qquad [\text{Math. 50}]$$

(where $\beta$ is a predetermined constant)

$$\phi_i(t) \leftarrow \frac{\beta}{2}\frac{1}{\alpha_i^\beta r_i(t)^{2-\beta}} \qquad [\text{Math. 51}]$$

$$V_i(f) \leftarrow \frac{1}{T}\sum_t \phi_i(t)x(f,t)x(f,t)^h \qquad [\text{Math. 52}]$$

The auxiliary function calculation unit 121 may further perform processing for stabilizing numerical calculation, as in Algorithm 1.

In S122, the first separation filter calculation unit 122 calculates the separation filter $w_i(f)$ (i=1, ..., K) using the auxiliary functions $V_i(f)$ (i=1, ..., K) and $V_z(f)$. Specifically, $I_{M-K}$ is an (M−K)-dimensional unit matrix, $e_j^{(M)}$ (j=1, ..., M) is an M-dimensional unit vector in which an j-th element is 1 and other elements are 0, $E_B = [e_1(M), \ldots, e_K^{(M)}]$, and $E_z = [e_{K+1}^{(M)}, \ldots, e_M^{(M)}]$, and the first separation filter calculation unit 120 calculates the separation filter $w_1(f)$ using the following equation when K=1, $$w_1(f) \leftarrow u(u^h V_1(f)u)^{-1/2} \qquad [\text{Math. 53}]$$

(where the vector u is a vector corresponding to the maximum eigenvalue $\lambda_{max}$ that satisfies $V_z(f)u = \lambda_{max} V_1(f)u$), and calculates the separation filters $w_i(f)$ (i=1, ..., K) using the following equation when K>1.

$$P_k(f) \leftarrow \left(W(f)^h V_k(f)\right)^{-1} [e_i^{(M)}, E_z](k=i, z) \qquad [\text{Math. 54}]$$

$$G_k(f) \leftarrow P_k(f)^h V_k(f) P_k(f)(k=i,z) \qquad [\text{Math. 55}]$$

$$w_i(f) \leftarrow P_i(f)b(b^h G_i(f)b)^{-1/2} \qquad [\text{Math. 56}]$$

(where the vector b is a vector corresponding to the maximum eigenvalue $\lambda_{max}$ that satisfies $G_i(f)b = \lambda_{max} G_z(f)b$)

In S123, the convergence condition determination unit 123 determines whether or not a predetermined convergence condition is satisfied, and outputs the separation filters $w_i(f)$ (i=1, ..., K) and proceeds to processing of S124 when the convergence condition is satisfied, and returns to the processing of S121 and repeats the processing of S121 to S123 when the convergence condition is not satisfied. As the predetermined convergence conditions, for example, a condition whether or not a predetermined number of repetitions has been reached, and a condition whether or not an update amount of each parameter (for example, the separation filters $w_i(f)$ (i=1, ..., K)) is equal to or smaller than (or is smaller than) a predetermined threshold value can be used.

In S124, the second separation filter calculation unit 124 calculates a separation filter $W_Z(f)$ using the following equation.

$$W_z(f) \leftarrow \begin{bmatrix} \left(W_s(f)^h V_z(f)E_s\right)^{-1}\left(W_s(f)^h V_z(f)E_z\right) \\ -I_{M-K} \end{bmatrix} \qquad [\text{Math. 57}]$$

(where $W_s(f) = [w_1(f), \ldots, w_K(f)]$)

In S130, the sound source signal generation unit 130 receives the observed signal x(f, t) and the separation matrix W(f) output in S120 as inputs, generates the i-th sound source signal $x_i(f, t)$ from the observed signal x(f, t) using the separation matrix W(f), and outputs the i-th sound source signal $x_i(f, t)$. The i-th sound source signal $x_i(f, t)$ may be calculated, for example, using the following equation.

$$x_i(f,t) \leftarrow (W(f)^{-h} e_i^{(M)}) w_i(f)^h x(f,t) \qquad [\text{Math. 58}]$$

According to the embodiment of the present invention, it is possible to execute sound source extraction processing at high speed.

Second Embodiment

In the present embodiment, a form for solving the Semi-BSE problem will be described.

The sound source signal generation device 200 generates the i-th sound source signal $x_i(f, t)$ (i=1, ..., K, f=1, ..., F, t=1, ..., T) that is an estimation signal of the i-th sound source from the observed signal x(f, t) (f=1, ..., F, t=1, ..., T) of mixed sound from the K sound sources observed using the M microphones. Here, K and M are integers satisfying 1≤K<M. Further, $W(f) = [w_1(f), \ldots, w_K(f), W_Z(f)]$ (where $w_i(f) \in C^M$ (i=1, ..., K) is a separation filter for an i-th sound source signal, and $W_Z(f) \in C^{M \times (M-K)}$ is a separation filter for a noise signal) is a separation matrix, $V_i(f)$ (i=1, ..., K) is an auxiliary function of the i-th sound source signal, and $V_Z(f)$ is an auxiliary function of the noise signal. L is an integer satisfying 1≤L≤K, $a_i(f) \in C^M$ (i=1, ..., L) is an acoustic transfer function from the i-th sound source to the M microphones, and $A_1(f) = [a_1(f), \ldots, a_L(f)]$.

Hereinafter, the sound source signal generation device 200 will be described with reference to FIGS. 1 and 2. FIG. 1 is a block diagram illustrating a configuration of the sound source signal generation device 200. FIG. 2 is a flowchart illustrating an operation of the sound source signal generation device 200. As illustrated in FIG. 1, the sound source signal generation device 200 includes an initialization unit 210, an optimization unit 220, a sound source signal generation unit 130, and a recording unit 190. The recording unit 190 is a component that appropriately records information necessary for processing of the sound source signal generation device 200.

The operation of the sound source signal generation device 200 will be described according to FIG. 2.

In S210, the initialization unit 210 initializes and outputs the separation matrix W(f) and the auxiliary function $V_Z(f)$.

The separation matrix W(f) and the auxiliary function $V_Z(f)$ may be initialized, for example, by processing 1 to 2 and 6 to 10 of Algorithm 1 described in <Technical Background>.

In S220, the optimization unit 220 receives the observed signal x(f, t), optimizes the separation matrix W(f) using the observed signal x(f, t), and outputs a result thereof.

Hereinafter, the optimization unit 220 will be described with reference to FIGS. 3 and 4. FIG. 3 is a block diagram illustrating a configuration of the optimization unit 220. FIG. 4 is a flowchart illustrating an operation of the optimization unit 220. As illustrated in FIG. 3, optimization unit 220 includes an auxiliary function calculation unit 121, a first separation filter calculation unit 222, a convergence condition determination unit 123, and a second separation filter calculation unit 224.

The operation of the optimization unit 220 will be described according to FIG. 4.

In S121, the auxiliary function calculation unit 121 calculates the auxiliary function $V_i(f)$ (i=1, . . . , K) according to a predetermined equation. The auxiliary function calculation unit 121 may perform calculation using the equation used by the auxiliary function calculation unit 121 of the first embodiment.

In S222, the first separation filter calculation unit 122 calculates the separation filter $w_i(f)$ (i=1, . . . , K) using the auxiliary functions $V_i(f)$ (i=1, . . . , K) and $V_z(f)$. Specifically, $I_{M-K}$ is an (M−K)-dimensional unit matrix, $e_j^{(d)}$ (j=1, . . . , d) is a d-dimensional unit vector in which a j-th element is 1 and other elements are 0, $E_2=[e_{L+1}^{(M)}, \ldots, e_M^{(M)}]$, $W_2'(f)=[A_1(f), E_2]^{-h}E_2$, $^-V_z(f)=W_2'(f)^h V_z(f)W_2'(f)$, $^-W(f)=[^-w_{L+1}(f), \ldots, ^-w_K(f), ^-W_Z(f)]$ (where $^-w_i(f) \in C^{(M-L)}$ (i=L+1, . . . , K) is a separation filter for an i-th sound source signal, $^-W_Z(f) \in C^{(M-L) \times (M-K)}$ is a separation filter for a noise signal), $^-E_s=[e_1^{(M-L)}, \ldots, e_{K-L}^{(M-L)}]$, $^-E_z=[e_{K-L+1}^{(M-L)}, \ldots, e_{M-L}^{(M-L)}]$, and the first separation filter calculation unit 220 calculates the separation filter $w_i(f)$ (i=1, . . . , K) using the following equation when L=K, and $$w_i(f) \leftarrow V_i(f)^{-1}A_1(f)(A_1(f)^h V_i(f)A_1(f))^{-1}e_i^{(K)} \quad \text{[Math. 59]}$$

calculates the separation filter $w_i(f)$ (i=1, . . . , K−1) using the following equation $$w_i(f) \leftarrow V_i(f)^{-1}A_1(f)(A_1(f)^h V_i(f)A_1(f))^{-1}e_i^{(K-1)} \quad \text{[Math. 60]}$$

and calculates the separation filter $w_K(f)$ using the following equation when L=K−1, $$\nabla_K(f) \leftarrow W_2'(f)^h V_K(f) W_2'(f) \quad \text{[Math. 61]}$$

$$w_K(f) \leftarrow W_2'(f)\bar{u}(\bar{u}^h \nabla_K(f)\bar{u})^{-1/2} \quad \text{[Math. 62]}$$

(where vector $^-u$ is a vector corresponding to a maximum eigenvalue $\lambda_{max}$ that satisfies $^-V_z(f)^-u=\lambda_{max}{}^-V_K(f)^-u$), and calculates the separation filter $w_i(f)$ (i=1, . . . , L) using the following equation $$w_i(f) \leftarrow V_i(f)^{-1}A_1(f)(A_1(f)^h V_i(f)A_1(f))^{-1}e_i^{(L)} \quad \text{[Math. 63]}$$

and calculates the separation filter $w_i(f)$ (i=L+1, . . . , K) using the following equation when L<K−1.

$$\bar{V}_i(f) \leftarrow W_2'(f)^h V_i(f) W_2'(f)(i = L+1, \ldots, K) \quad \text{[Math. 64]}$$

-continued $$\bar{P}_k(f) \leftarrow (\overline{W}(f)^h \overline{V}_k(f))^{-1}[e_i^{(M-L)}, \bar{E}_z](k = i, z) \quad \text{[Math. 65]}$$

$$\bar{G}_k(f) \leftarrow \bar{P}_k(f)^h \overline{V}_k(f)\bar{P}_k(f)(k = i, z) \quad \text{[Math. 66]}$$

$$w_i(f) \leftarrow W_2'(f)\bar{P}_i(f)\bar{b}(\bar{b}^h \bar{G}_i(f)\bar{b})^{-\frac{1}{2}} \quad \text{[Math. 67]}$$

(where vector $^-b$ is a vector corresponding to the maximum eigenvalue $\lambda_{max}$ that satisfies $^-G_i(f)^-b=\lambda_{max}{}^-G_z(f)^-b$)

In S123, the convergence condition determination unit 123 determines whether or not a predetermined convergence condition is satisfied, and outputs the separation filters $w_i(f)$ (i=1, . . . , K) and proceeds processing of S224 when the convergence condition is satisfied, and returns to processing of S121 and repeats the processes of S121 to S123 when the convergence condition is not satisfied.

In S224, the second separation filter calculation unit 124 calculates the separation filter $W_Z(f)$ using the following equation.

$$W_z(f) \leftarrow W_2'(f)\left[\begin{array}{c}(\bar{W}_s(f)^h \bar{V}_z(f)\bar{E}_s)^{-1}(\bar{W}_s(f)^h \bar{V}_z(f)\bar{E}_z) \\ -I_{M-K}\end{array}\right] \quad \text{[Math. 68]}$$

(where $-W_s(f) = [-w_{L+1}(f), \ldots, -w_K(f)]$)

In S130, the sound source signal generation unit 130 receives the observed signal x(f, t) and the separation matrix W(f) output in S120 as inputs, generates the i-th sound source signal $x_i(f, t)$ from the observed signal x(f, t) using the separation matrix W(f), and output the i-th sound source signal $x_i(f, t)$.

According to the embodiment of the present invention, it is possible to execute sound source extraction processing at high speed.

Supplement

FIG. 5 is a diagram illustrating an example of a functional configuration of a computer 2000 that realizes each of the above-described devices. The processing in each of the above-described devices can be performed by causing a recording unit 2020 to read a program for causing the computer 2000 to function as each of the above-described devices, and causing the program to be operated in a control unit 2010, an input unit 2030, an output unit 2040, and the like.

The device of the present invention includes, for example, as single hardware entities, an input unit to which a keyboard or the like can be connected, an output unit to which a liquid crystal display or the like can be connected, a communication unit to which a communication device (for example, a communication cable) capable of communication with the outside of the hardware entity can be connected, a CPU (Central Processing Unit, which may include a cache memory, a register, and the like), a RAM or a ROM that is a memory, an external storage device that is a hard disk, and a bus connected for data exchange with the input unit, the output unit, the communication unit, the CPU, the RAM, the ROM, and the external storage devices. Further, a device (drive) capable of reading and writing from and to a recording medium such as a CD-ROM may be provided in the hardware entity as necessary. An example of a physical entity including such hardware resources is a general-purpose computer.

A program necessary to realize the above-described functions, data necessary for processing of this program, and the like are stored in the external storage device of the hardware entity (the present invention is not limited to the external storage device, for example, the program may be stored in a ROM that is a read only storage device). Further, for example, data obtained by the processing of the program is appropriately stored in a RAM, the external storage device, or the like.

In the hardware entity, each program and data necessary for the processing of each program stored in the external storage device (or a ROM, for example) are read into a memory as necessary and appropriately interpreted, executed, or processed by a CPU. As a result, the CPU realizes a predetermined function (each of components represented by the unit, means, or the like).

The present invention is not limited to the above-described embodiment, and appropriate changes can be made without departing from the spirit of the present invention. Further, the processes described in the embodiments are not only executed in time series in the described order, but also may be executed in parallel or individually according to a processing capability of a device that executes the processes or as necessary.

As described above, when a processing function in the hardware entity (the device of the present invention) described in the embodiment is realized by a computer, processing content of a function that the hardware entity should have is described by a program. By executing this program using the computer, the processing function in the hardware entity is realized on the computer.

A program describing this processing content can be recorded on a computer-readable recording medium. An example of the computer-readable recording medium may include any recording medium such as a magnetic recording device, an optical disc, a magneto-optical recording medium, and a semiconductor memory. Specifically, for example, a hard disk device, a flexible disk, a magnetic tape, or the like can be used as a magnetic recording device, a DVD (Digital Versatile Disc), a DVD-RAM (Random Access Memory), a CD-ROM (Compact Disc Read Only Memory), a CD-R (Recordable)/RW (ReWritable), or the like can be used as an optical disc, an MO (Magneto-Optical disc) or the like can be used as a magneto-optical recording medium, and an EEP-ROM (Electrically Erasable and Programmable-Read Only Memory) or the like can be used as a semiconductor memory.

Further, this program is distributed by, for example, selling, transferring, or lending a portable recording medium such as a DVD or a CD-ROM on which the program has been recorded. Further, the program may be stored in a storage device of a server computer and distributed by being transferred from the server computer to another computer via a network.

The computer that executes such a program first temporarily stores, for example, the program recorded on the portable recording medium or the program transferred from the server computer in a storage device of the computer. When the computer executes the processing, the computer reads the program stored in the storage device of the computer and executes processing according to the read program. Further, as another embodiment of the program, the computer may directly read the program from the portable recording medium and execute a process according to the program, and further, a process according to a received program may be sequentially executed each time the program is transferred from the server computer to the computer. Further, a configuration in which the above-described process is executed by a so-called ASP (Application Service Provider) type service for realizing a processing function according to only an execution instruction and result acquisition without transferring the program from the server computer to the computer may be adopted. It is assumed that the program in the present embodiment includes information provided for a process of an electronic computer and being pursuant to the program (such as data that is not a direct command to the computer, but has properties defining a process of the computer).

Further, although the hardware entity is configured by a predetermined program being executed on the computer in the present embodiment, at least a part of the processing content of the hardware entity may be realized in hardware.

The above description of the embodiments of the present invention is presented for the purpose of illustration and description. There is no intention to be exhaustive and there is no intention to limit the invention to a disclosed exact form. Modifications or variations are possible from the above-described teachings. The embodiments are selectively represented in order to provide the best illustration of the principle of the present invention and in order for those skilled in the art to be able to use the present invention in various embodiments and with various modifications so that the present invention is suitable for deliberated practical use. All of such modifications or variations are within the scope of the present invention defined by the appended claims interpreted according to a width given fairly, legally and impartially.

The invention claimed is:

1. A sound source signal generation device in which K and M are integers satisfying $1 \leq K < M$, $x(f, t)$ ($f=1, \ldots, F$, $t=1, \ldots, T$, and F and T are integers satisfying $1 \leq F$ and $1 \leq T$) (where f is an index indicating a frequency bin and t is an index indicating a time frame) is an observed signal of mixed sound from K sound sources observed using M microphones, $x_i(f, t)$ ($i=1, \ldots, K$, $f=1, \ldots, F$, $t=1, \ldots, T$) is an i-th sound source signal, the i-th sound source signal being an estimation signal of an i-th sound source, $W(f) = [w_1(f), \ldots, w_K(f), W_Z(f)]$ (where C is a set of complex numbers, $w_i(f) \in C^M$ ($i=1, \ldots, K$) is a separation filter for the i-th sound source signal, z represents noise signal, and $W_Z(f) \in C^{M \times (M-K)}$ is a separation filter for a noise signal) is a separation matrix, $V_i(f)$ ($i=1, \ldots, K$) is an auxiliary function of the i-th sound source signal, and $V_Z(f)$ is an auxiliary function of the noise signal, the sound source signal generation device comprising
an initialization circuitry configured to initialize a separation matrix $W(f)$ and an auxiliary function $V_Z(f)$;
an optimization circuitry configured to optimize the separation matrix $W(f)$ using the observed signal $x(f, t)$; and
a sound source signal generation circuitry configured to generate an i-th sound source signal $x_i(f, t)$ from the observed signal $x(f, t)$ using the separation matrix $W(f)$,
wherein the optimization circuitry includes
an auxiliary function calculation circuitry configured to calculate the auxiliary function $V_i(f)$ ($i=1, \ldots, K$) using the following equations;

$$s_i(f, t) \leftarrow w_i(f)^h \times (f, t)$$

(where h represents complex conjugate transpose and $s_i(f, t)$ is a complex number)

$$r_i(t) \leftarrow \|s_i(t)\|$$

(where $s_i(t)=[s_i(1, t), \ldots, s_i(F, t)]^T$ is a vector and $r_i(t)$ is a real number)

$$\alpha_i^\beta \leftarrow \frac{\beta}{2F}\left(\frac{1}{T}\sum_t r_i(t)^\beta\right)$$

(where $\beta$ is a predetermined constant and $\alpha_i^\beta$ is a real number)

$$\phi_i(t) \leftarrow \frac{\beta}{2}\frac{1}{\alpha_i^\beta r_i(t)^{2-\beta}}$$

(where $\varphi_i(t)$ is a real number)

$$V_i(f) \leftarrow \frac{1}{T}\sum_t \phi_i(t) \times (f, t) \times (f, t)^h$$

a first separation filter calculation circuitry configured to calculate the separation filters $w_i(f)$ ($i=1, \ldots, K$) using auxiliary functions $V_i(f)$ ($i=1, \ldots, K$) and $V_z(f)$; and a second separation filter calculation circuitry configured to calculate a separation filter $W_Z(f)$ according to a predetermined equation when a convergence condition is satisfied.

2. The sound source signal generation device according to claim 1, wherein $I_{M-K}$ is an (M–K)-dimensional unit matrix, $e_j^{(M)}$ ($j=1, \ldots, M$) is an M-dimensional unit vector in which a j-th element is 1 and other elements are 0, $E_s=[e_1(M), \ldots, e_K^{(M)}]$ is a matrix, and $E_z=[e_{K+1}^{(M)}, \ldots, e_M^{(M)}]$ is a matrix, and the first separation filter calculation circuitry calculates a separation filter $w_1(f)$ using the following equation when K=1, $$w_1(f) \leftarrow u(u^h V_1(f)u)^{-\frac{1}{2}}$$

(where the vector u is a vector corresponding to a maximum eigenvalue $\lambda_{max}$ satisfying $V_z(f)u=\lambda_{max}V_1(f)u$), and calculates the separation filters $w_i(f)$ ($i=1, \ldots, K$) using the following equation when K>1

$$P_k(f) \leftarrow (W(f)^h V_k(f))^{-1}[e_i^{(M)}, E_z](k = i, z)$$

(where $P_k(f)$ is a matrix)

$$G_k(f) \leftarrow P_k(f)^h V_k(f) P_k(f) (k = i, z)$$

(where $G_k(f)$ is a matrix)

$$w_i(f) \leftarrow P_i(f)b(b^h G_i(f)b)^{-\frac{1}{2}}$$

(where the vector b is a vector corresponding to a maximum eigenvalue $\lambda_{max}$ satisfying $G_i(f)b=\lambda_{max}G_z(f)b$), and a predetermined equation used by the second separation filter calculation circuitry is the following equation $$W_z(f) \leftarrow \left[(W_s(f)^h V_z(f) E_s)^{-1}(W_s(f)^h V_z(f) E_z) - I_{M-K}\right]$$

(where $W_s(f) = [w_1(f), \ldots, w_K(f)]$).

3. The sound source signal generation device according to claim 1, wherein L is an integer satisfying $1 \leq L \leq K$, $a_i(f) \in C^M$ ($i=1, \ldots, L$) is an acoustic transfer function from the i-th sound source to the M microphones, $A_1(f)=[a_1(f), \ldots, a_L(f)]$ is a matrix, $I_{M-K}$ is an (M–K)-dimensional unit matrix, $e_j^{(d)}$ ($j=1, \ldots, d$) is a d-dimensional unit vector in which a j-th element is 1 and other elements are 0, $E_2=[e_{L+1}^{(M)}, \ldots, e_M^{(M)}]$ is a matrix, $W_2'(f)=[A_1(f), E_2]^{-h}E_2$ is a matrix, $^-V_z(f)=W_2'(f)^h V_z(f)W_2'(f)$ is a matrix, $^-W(f)=[^-w_{L+1}(f), \ldots, ^-w_K(f), ^-W_Z(f)]$ (where $^-w_i(f) \in C^{(M-L)}$ ($i=L+1, \ldots, K$) is a separation filter for an i-th sound source signal, and a matrix $^-W_Z(f) \in C^{(M-L)\times(M-K)}$ is a separation filter for a noise signal) is a matrix, $^-E_s=[e_1^{(M-L)}, \ldots, e_{K-L}^{(M-L)}]$ is a matrix, $^-E_z=[e_{K-L+1}^{(M-L)}, \ldots, e_{M-L}^{(M-L)}]$ is a matrix, the first separation filter calculation circuitry calculates the separation filters $w_i(f)$ ($i=1, \ldots, K$) using the following equation when L=K, and $$w_i(f) \leftarrow V_i(f)^{-1}A_1(f)(A_1(F)^h V_i(f) A_i(f))^{-1} e_i^{(K)}$$

calculates the separation filter $w_i(f)$ ($i=1, \ldots, K-1$) using the following equation $$w_i(f) \leftarrow V_i(f)^{-1}A_1(f)(A_1(F)^h V_i(f) A_i(f))^{-1} e_i^{(K-1)}$$

and calculates a separation filter $w_K(f)$ using the following equation when L=K–1, $$\overline{V}_K(f) \leftarrow W_2'(f)^h V_K(f) W_2'(f)$$

(where $^-V_k(f)$ is a matrix)

$$w_K(f) \leftarrow W_2'(f)\overline{u}(\overline{u}^h \tilde{V}_K(f)\overline{u})^{-\frac{1}{2}}$$

(where vector $^-u$ is a vector corresponding to a maximum eigenvalue $\lambda_{max}$ that satisfies $^-V_z(f)^-u=\lambda_{max}{}^-V_k(f)^-u$), and calculates a separation filter $w_i(f)$ ($i=1, \ldots, L$) using the following equation $$w_l(f) \leftarrow V_l(f)^{-1} A_1(f) \left( A_1(f)^h V_l(f) A_1(f) \right)^{-1} e_i^{(l)}$$

and calculates a separation filter $w_i(f)$ (i=L+1, ..., K) using the following equation when L<K−1, $$\overline{V}_i(f) \leftarrow W_2'(f)^h V_i(f) W_2'(f)(i = L+1, \ldots, K)$$

(where $\overline{V}_i(f)$ is a matrix)

$$\overline{P}_k(f) \leftarrow \left( \overline{W}(f)^h \overline{V}_k(f) \right)^{-1} \left[ e_i^{(M-1)}, \overline{E}_z \right] (k = i, z)$$

(where $\overline{P}_k(f)$ is a matrix)

$$\overline{G}_k(f) \leftarrow \overline{P}_k(f)^h \overline{V}_k(f) \overline{P}_k(f)(k = i, z)$$

(where $\overline{G}_k(f)$ is a matrix)

$$w_i(f) \leftarrow W_2'(f) \overline{P}_i(f) \overline{b} \left( \overline{b}^h \overline{G}_i(f) \overline{b} \right)^{-\frac{1}{2}}$$

(where vector $\overline{b}$ is a vector corresponding to the maximum eigenvalue $\lambda_{max}$ that satisfies $\overline{G}_i(f)\overline{b}=\lambda_{max}\overline{G}_z(f)\overline{b}$), and a predetermined equation used by the second separation filter calculation circuitry is the following equation $$W_2(f) \leftarrow W_2'(f) \left[ \left( \overline{W}_s(f)^h \overline{V}_z(f) \overline{E}_s \right)^{-1} \left( \overline{W}_s(f)^h \overline{V}_z(f) \overline{E}_z \right) - I_{M-K} \right]$$

(where $\overline{W}_s(f)=[\overline{w}_{L+1}(f), \ldots, \overline{w}_K(f)]$ is a matrix).

4. A sound source signal generation method in which K and M are integers satisfying 1≤K<M, x(f, t) (f=1, ..., F, t=1, ..., T, where F and T are integers satisfying 1≤F and 1≤T) (where f is an index indicating a frequency bin, and t is an index indicating a time frame) is an observed signal of mixed sound from K sound sources observed using M microphones, $x_i$(f, t) (i=1, ..., K, f=1, ..., F, t=1, ..., T) is an i-th sound source signal, the i-th sound source signal being an estimation signal of an i-th sound source, W(f)=[$w_1$(f), ..., $w_K$(f), $W_Z$(f)] (where C is a set of complex numvbers, $w_i(f) \in C^M$ (i=1, ..., K) is a separation filter for the i-th sound source signal, z represents noise signal, and $W_Z(f) \in C^{M \times (M-K)}$ is a separation filter for a noise signal) is a separation matrix, $V_i$(f) (i=1, ..., K) is an auxiliary function of the i-th sound source signal, and $V_Z$(f) is an auxiliary function of the noise signal, and the sound source signal generation method comprises
an initialization step of initializing, by a sound source signal generation device, a separation matrix W(f) and an auxiliary function $V_Z$(f);
an optimization step of optimizing, by the sound source signal generation device, the separation matrix W(f) using the observed signal x(f, t); and
a sound source signal generation step of generating, by the sound source signal generation device, an i-th sound source signal $x_i$(f, t) from the observed signal x(f, t) using the separation matrix W(f),
wherein the optimization step includes
an auxiliary function calculation step of calculating the auxiliary function $V_i$(f) (i=1, ..., K) using the following equation, $$s_i(f, t) \leftarrow w_i(f)^h x(f, t)$$

(where h represents complex conjugate transpose and $s_i$(f, t) is a complex number)

$$r_i(t) \leftarrow \|s_i(t)\|$$

(where $s_i(t)=[s_i(1, t), \ldots, s_i(F, t)]$ T is a vector and $r_i(t)$ is a real number]

$$\alpha_i^\beta \leftarrow \frac{\beta}{2F} \left( \frac{1}{T} \sum_t r_i(t)^\beta \right)$$

(where β is a predetermined constant and $\alpha_i^\beta$ is a real number)

$$\phi_i(t) \leftarrow \frac{\beta}{2} \frac{1}{\alpha_i^\beta r_i(t)^{2-\beta}}$$

(where $\varphi_i(t)$ is a real number)

$$V_i(f) \leftarrow \frac{1}{T} \sum_t \phi_i(t) x(f, t) x(f, t)^h$$

a first separation filter calculation step of calculating the separation filters $w_i$(f) (i=1, ..., K) using auxiliary functions $V_i$(f) (i=1, ..., K) and $V_Z$(f); and
a second separation filter calculation step of calculating a separation filter $W_Z$(f) according to a predetermined equation when a convergence condition is satisfied.

5. A non-transitory computer-readable recording medium storing a program for causing a computer to function as the sound source signal generation device according to claim 1.

* * * * *